United States Patent
Carrie et al.

[11] Patent Number: 5,912,219
[45] Date of Patent: Jun. 15, 1999

[54] ACIDIC CLEANING COMPOSITIONS

[75] Inventors: Michel Jean Carrie, Strombeek-Bever; Eddy Vos, Linden, both of Belgium

[73] Assignee: The Procter & Gamble Company, Cincinnati, Ohio

[21] Appl. No.: 08/687,417

[22] PCT Filed: Feb. 2, 1995

[86] PCT No.: PCT/US95/01299

§ 371 Date: Sep. 11, 1996

§ 102(e) Date: Sep. 11, 1996

[87] PCT Pub. No.: WO95/21231

PCT Pub. Date: Aug. 10, 1995

[30] Foreign Application Priority Data

Feb. 3, 1994 [EP] European Pat. Off. .............. 94870020

[51] Int. Cl.$^6$ ................................. C11D 1/62; C11D 1/66; C11D 1/68; C11D 3/22

[52] U.S. Cl. .......................... 510/238; 510/247; 510/161; 510/191; 510/253; 134/3

[58] Field of Search ..................................... 510/238, 247, 510/161, 191, 253; 134/3

[56] References Cited

U.S. PATENT DOCUMENTS

| | | | |
|---|---|---|---|
| 3,277,008 | 10/1966 | Heit | 510/247 |
| 4,581,161 | 4/1986 | Nedonchelle | 510/247 |
| 4,891,150 | 1/1990 | Gross | 510/247 |
| 5,008,030 | 4/1991 | Cook et al. | 510/238 |
| 5,192,460 | 3/1993 | Thomas et al. | 510/238 |
| 5,308,401 | 5/1994 | Geke et al. | 510/245 |

*Primary Examiner*—Jacqueline V. Howard
*Attorney, Agent, or Firm*—Robert B. Aylor; T. D. Reed

[57] ABSTRACT

Aqueous compositions comprise maleic acid and a surfactant consisting of a cationic surfactant, a zwitterionic surfactant, an amphoteric surfactant or mixtures thereof. Said compositions are substantially odor-free and do not contain any perfume.

23 Claims, No Drawings

ACIDIC CLEANING COMPOSITIONS

This is a 371 of PCT/US95/01299 filed Feb. 2, 1995.

TECHNICAL FIELD

The present invention relates to cleaning compositions for hard-surfaces. More specifically, compositions are described which comprise surfactants which are substantially odor-free. Indeed, said compositions give optimal performance in removing limescale stains and encrustations while being odor-free and are particularly adapted for descaling appliances.

BACKGROUND

It is well known in the art that limescale deposits can be chemically removed with acidic solutions, and a great variety of acidic cleaning compositions have been described for this purpose.

Furthermore, it is known in the art to use surfactants in such acidic compositions to lower the surface tension and to improve the wettability of the surfaces being cleaned. The presence of surfactants in such compositions helps to solubilize the soils and to improve the streaking profile of the acids, thereby also slowing down the limescale redeposition phenomenon.

However, the presence of surfactants causes the problem that a base odor is imparted to the compositions comprising them, thereby making them not attractive from a consumer point of view. This base odor, chemical in nature, can be due to the surfactant molecules themselves, to the presence of unreacted intermediates from the surfactant making process or to other impurities within the surfactant raw materials.

To overcome this problem it is well known in the art to add a perfume in surfactant-based compositions, one of its role being to effectively mask the surfactants base odor. However, it has been found that perfumes tend to deposit onto synthetic materials and are thus difficult to rinse off.

This is even more of a problem in applications such as the descaling of appliances including cooking appliances (e.g. coffee machine), beauty care appliances (e.g. dental jet machine) or any other appliance such as steam irons, kettles and the like, as said appliances comprise various synthetic surfaces. Indeed, during the descaling operation of such an appliance perfumes firstly tend to deposit onto the synthetic surfaces and then tend to be released during the normal use of said appliance. In other words, food or beverage can be contaminated during the normal use of a cooking appliance, when said normal use follows the descaling operation of said appliance with a composition comprising perfumes. This is highly undesirable from a consumer acceptance viewpoint. Thus it is desirable to use descaling compositions being free of perfumes.

It is therefore an object of the present invention to provide a composition comprising surfactants and an organic acid, for the removal of limescale deposits, said composition being free of perfume and possessing a superior limescale removing capacity while being also substantially odor-free.

It has now been found that compositions comprising an organic acid being substantially odor-free such as maleic acid together with a surfactant consisting of cationic, zwitterionic, amphoteric surfactants or mixtures thereof are substantially odor-free without the need of adding any further compound such as a perfume to mask the surfactants base odor. Indeed, we have found that cationic, zwitterionic, amphoteric surfactants or mixtures thereof do not impart a base odor to a composition, or to the surfaces treated with said composition, provided that the pH of the composition is neutral or maintained in the acidic range. Unexpectedly the compositions of the present invention comprising maleic acid and such a surfactant or mixtures thereof under neutral or acidic conditions, are substantially odor-free compared to the same compositions with equivalent amount of other surfactant types such as anionic, nonionic, amine oxide surfactants or mixtures thereof.

An advantage of the present invention is that said compositions are particularly suitable for applications in which the presence of perfume is not desirable including the descaling of appliances such as cooking appliances, beauty care appliances or any other appliance such as steam irons, kettles, coffee machines, tea pots and the like.

A further advantage is that the compositions of the present invention are also safe to a wide variety of materials used to manufacture said appliances, including synthetic materials as well as any type of metal (e.g. aluminum, stainless steel, chromed steel and the like).

European patent application No. 93870120.8 discloses an acidic composition comprising an acid for example maleic acid together with a thickening system comprising from 0.5% to 15% by weight of the total composition of a mixture of a nonionic surfactant and a cationic surfactant. No reference is made to the possibility to provide substantially odor-free surfactants based compositions due to the use of said cationic surfactants as the surfactant.

GB 2071 688 and EP 255 978 disclose acidic compositions comprising among other ingredients from 0.1% to 10% by weight of cationic surfactants and a strong inorganic acid. Organic acids and in particular maleic acid are not disclosed. No reference is made to the possibility to provide substantially odor-free surfactants based compositions due to the use of said cationic surfactants as the surfactant.

SUMMARY OF THE INVENTION

The present invention is an aqueous composition having a pH of from 0.1 to 7 comprising an organic acid, a surfactant and is free of any perfume. Said surfactant consists of a cationic, zwitterionic or amphoteric surfactant or mixtures thereof.

The present invention also encompasses a process of descaling appliances wherein an acidic composition comprising a cationic surfactant, a zwitterionic surfactant, an amphoteric surfactant or mixtures thereof, is applied in its neat form or in its diluted form to said appliances, then left to act and then removed by rinsing.

DETAILED DESCRIPTION OF THE INVENTION

The compositions according to the present invention are designed for removing limescale deposits. Thus they comprise as a first essential ingredient an organic acid such as maleic acid. Said organic acid is also per se substantially odor-free. The compositions according to the present invention comprise from 0.1% to 45% by weight of the total composition of maleic acid, preferably from 1% to 25% and more preferably from 8% to 20%. This percentage is calculated on the basis of the molecular weight of the acid form, but maleic anhydride is equally convenient for use in the compositions according to the present invention. Indeed maleic anhydride is generally cheaper and it is transformed into the acid form when incorporated in an aqueous medium. In a preferred embodiment of the present invention maleic acid is used alone. However, other acids which are particularly efficient in removing limescale deposits may be used in addition to said organic acid, at levels at which they do not impart a base odor to the compositions. Such optional acids are for example sulfonic acids such as sulfamic acid or methanesulfonic acid, hydrochloric acid, citric acid, phosphoric acid or mixtures thereof. In another embodiment of the present invention maleic acid is used together with sulfonic acids such as sulfamic acid or methanesulfonic acid or/and citric acid.

The compositions according to the present invention comprise as a second essential ingredient a surfactant consisting of a cationic, a zwitterionic or an amphoteric surfactant or mixtures thereof. The compositions according to the present invention comprise from 0.01% to 10% of said surfactant, preferably from 0.01% to 5%, more preferably from 0.01% to 2%. In a preferred embodiment of the present invention where the compositions are used to descale appliances the surfactant is present at a level below 1% by weight of the total composition, preferably from 0.01% to 0.9% and more preferably from 0.05% to 0.8%. It is possible to use mixtures of a type of surfactant or of different types of surfactants hereinafter described, without departing from the spirit of the present invention.

It is preferred to use cationic surfactants in the compositions of the present invention. Suitable cationic surfactants to be used herein include derivatives of quaternary ammonium, phosphonium, imidazolium and sulfonium compounds. Preferred cationic surfactants for use herein are according to the formula $R_1R_2R_3R_4N^+$ $X^-$, wherein X is a counteranion, $R_1$ is a $C_8$–$C_{20}$ hydrocarbon chain and $R_2$, $R_3$ and $R_4$ are independently selected from H or $C_1$–$C_4$ hydrocarbon chains. In a preferred embodiment of the present invention, $R_1$ is a $C_{12}$–$C_{18}$ hydrocarbon chain, most preferably $C_{14}$, $C_{16}$ or $C_{18}$, and $R_2$, $R_3$ and $R_4$ are all three methyl, and X is halogen, preferably bromide or chloride, most preferably bromide. Examples of cationic surfactants are stearyl trimethyl ammonium bromide (STAB), cetyl trimethyl ammonium bromide (CTAB) and myristyl trimethyl ammonium bromide (MTAB).

Suitable zwitterionic surfactants to be used herein contain both cationic and anionic hydrophilic groups on the same molecule at a relatively wide range of pH's. The typical cationic group is a quaternary ammonium group, although other positively charged groups like phosphonium, imidazolium and sulfonium groups can be used. The typical anionic hydrophilic groups are carboxylates and sulfonates, although other groups like sulfates, phosphonates, and the like can be used. A generic formula for some preferred zwitterionic surfactants is

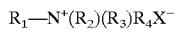

wherein $R_1$ is a hydrophobic group; $R_2$ and $R_3$ are each $C_1$–$C_4$ alkyl, hydroxy alkyl or other substituted alkyl group which can also be joined to form ring structures with the N; $R_4$ is a moiety joining the cationic nitrogen atom to the hydrophilic group and is typically an alkylene, hydroxy alkylene, or polyalkoxy group containing from 1 to 4 carbon atoms; and X is the hydrophilic group which is preferably a carboxylate or sulfonate group. Preferred hydrophobic groups $R_1$ are alkyl groups containing from 8 to 22, preferably less than 18, more preferably less than 16 carbon atoms. The hydrophobic group can contain unsaturation and/or substituents and/or linking groups such as aryl groups, amido groups, ester groups and the like. In general, the simple alkyl groups are preferred for cost and stability reasons.

Other specific zwitterionic surfactants have the generic formulas:

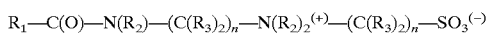

or

wherein each $R_1$ is a hydrocarbon, e.g. an alkyl group containing from 8 up to 20, preferably up to 18, more preferably up to 16 carbon atoms, each $R_2$ is either a hydrogen (when attached to the amido nitrogen), short chain alkyl or substituted alkyl containing from one to 4 carbon atoms, preferably groups selected from the group consisting of methyl, ethyl, propyl, hydroxy substituted ethyl or propyl and mixtures thereof, preferably methyl, each $R_3$ is selected from the group consisting of hydrogen and hydroxy groups and each n is a number from 1 to 4, preferably from 2 to 3, more preferably 3, with no more than one hydroxy group in any $(C(R_3)_2)$ moiety. The $R_1$ groups can be branched and/or unsaturated. The $R_2$ groups can also be connected to form ring structures. Preferred herein is a surfactant of this type, a $C_{10}$–$C_{14}$ fatty acylamidopropylene (hydroxypropylene) sulfobetaine that is available from the Sherex Company under the trade name "Varion CAS sulfobetaine"®.

Suitable amphoteric surfactants to be used herein are surfactants which are similar to the zwitterionic surfactants but without the quaternary group. Indeed, they contain an amine group instead of the quaternary group. They contain said amine group that is protonated at the low pH of the composition to form cationic group and they may also possess an anionic group at these pHs.

The third essential feature of the compositions of the present invention is their pH. The compositions according to the present invention have a pH of from 0.1 to 7. Indeed, it has been found that the surfactants as defined in the present invention are substantially odor-free under neutral and acidic conditions whereas the same compounds impart a base odor to a composition comprising them under alkaline conditions. However, the limescale removing capacity of a composition according to the present invention is strongly dependent on its pH, and the lower the pH, the better the limescale removing capacity. Thus, the compositions according to the present invention preferably have a pH as is in the range of from 0.1 to 5, more preferably of from 0.1 to 3 and most preferably of from 0.5 to 2.

It has been observed that compositions according to the present invention having a pH of from 0.1 to 7 comprising an organic acid such as maleic acid together with a surfactant consisting of a cationic, zwitterionic, amphoteric surfactant or mixtures thereof, are substantially odor free compared to similar compositions comprising equivalent amount of other surfactant types such as anionic, nonionic surfactants, amine oxide surfactants or mixtures thereof. Indeed, the use of the cationic, zwitterionic, amphoteric surfactants or mixtures thereof according to the present invention in hard-surfaces limescale removing compositions comprising maleic acid and no perfume improves the base odor of said compositions.

By "improving the base odor" it is to be understood that the smell due to the presence of surfactants in a composition having a pH of from 0.1 to 7 is reduced when the surfactant used in said composition is a cationic surfactant, a zwitterionic, an amphoteric surfactant or mixtures thereof as defined in the present invention. A method suitable for measuring "the base odor improvement", i.e. the smell reduction phenomenon, is an olfactory grading method mentioned hereinafter in the examples. In said method professional perfumers give a description of the odor (e.g. amine, fatty) as well as an evaluation of the odor impact (e.g. weak or strong).

Furthermore, it has now been found that acidic compositions comprising maleic acid together with a surfactant consisting of the surfactant hereinbefore described, at a level below it by weight of the total composition, are particularly suitable for descaling applications where good wetting and low sudsing properties are essential but in which the presence of a surfactant base odor or the presence of perfumes to mask said odor is not desirable from a consumer acceptance. A typical such application is the descaling of cooking appliances such as coffee machines, of beauty care appliances or even of any appliance where the presence of perfumes and/or any base odor is not desirable (steam irons, kettles, and the like).

The compositions according to the present invention are aqueous. Accordingly, the compositions according to the present invention comprise from 10% to 95% by weight of the total composition of water, preferably from 50% to 90%, most preferably from 70% to 85%.

The compositions according to the present invention may further comprise a variety of other ingredients including colorants, bactericide, thickeners, dyes, chelants, pigments, solvents, stabilizers, corrosion inhibitors and the like.

The present invention also encompasses a process of descaling appliances wherein an acidic composition comprising a surfactant consisting of a cationic, a zwitterionic, an amphoteric surfactant or mixtures thereof is applied in its neat form or in its diluted form to said appliances, then left to act and then removed by rinsing.

The expression "applied in diluted form" herein includes dilution by the user, which occurs for instance in the application of descaling appliances. Typical dilution levels are of from 0.5% to 50% of the compositions.

The compositions herein are also particularly suitable to be used in hot conditions, e.g. when descaling a coffee machine said compositions can be used neat or diluted and in hot conditions (80° C. to 180° C.).

The present invention is further illustrated by the following experimental data and examples.

EXPERIMENTAL DATA

1)

Compositions according to the present invention were evaluated in terms of their base odor with an olfactory grading test method.

For this purpose compositions according to the present invention have been prepared. These compositions are made comprising the listed ingredients in the listed proportions (weight %).

| Ingredients: | Compositions | | | |
|---|---|---|---|---|
| (% by weight) | 1 | 2 | 3 | 4 |
| Maleic acid | 6 | 6 | 6 | 14 |
| MTAB* | 3 | / | / | / |
| Cocoamido propyl hydroxysulfobetaine** | / | 3 | / | / |
| Amine oxide | / | / | 3 | / |
| Lutensol AO 7*** | / | / | / | 0.5 |
| Waters & Minors | up to 100 | | | |

*MTAB is myristic trimethylammonium bromide (cationic surfactant).
**Cocoamido propyl hydroxysulfobetaine is a zwitterionic surfactant.
***Lutensol AO7 is a nonionic surfactant.

The odor evaluation was conducted by a panel of two professional perfumers who evaluated compositions 1, 2, 3 and 4 at three different pH values (e.g. highly acidic, neutral and highly basic) placed in blind bottles. Each panelist smelled each of the three pH variations of the above compositions and gave a description of the odor per se in terms of fatty, amine, waxy or aldehyde odor as well as an evaluation of the odor impact itself.

| | Odor test results: | | | |
|---|---|---|---|---|
| Comp. | 1 | 2 | 3 | 4 |
| pH = 1.5 | neutral | weak fatty | green waxy strong fatty | fatty |
| pH = 7 | neutral | weak fatty | waxy strong fatty | / |
| pH = 12 | strong amine | strong fatty | aldehyde weak fatty | / |

The results show that composition 1 based on a cationic surfactant has a strong amine odor under alkaline conditions whereas under neutral and acidic conditions said composition 1 smells neutral, i.e. is substantially odor-free. The results also show that composition 2 based on a zwitterionic surfactant has a strong fatty odor under alkaline conditions whereas under neutral and acidic conditions said composition 2 has an improved base odor (weak fatty odor). Furthermore, in contrast to compositions 1 and 2 which show an improved base odor under neutral and acidic pH conditions, composition 3 which includes amine oxide as a surfactant does not display a better base odor in acid medium compared to alkaline conditions. The results also show that composition 4 which includes a nonionic surfactant does smell (fatty odor) under acidic conditions (pH=1.5) compared to compositions 1 and 2 which are substantially odor free at the same pH.

Thus, according to the present invention compositions comprising maleic acid and as a surfactant a cationic surfactant or a zwitterionic surfactant are substantially base odor free under neutral and acidic conditions compared to the same compositions having other surfactant types as for example amine oxide or nonionic surfactants.

2)

Further examples of compositions according to the present invention are the following. These compositions are made comprising the listed ingredients in the listed proportions (weight %).

| Ingredients: | Compositions | | |
|---|---|---|---|
| (% by weight) | 1 | 2 | 3 |
| Maleic acid | 19 | 16 | 14 |
| Citric acid | / | 3 | 3 |
| Sulfamic acid | / | / | 2 |
| MTAB* | 0.2 | 0.2 | 0.2 |
| Waters & Minors | up to 100 | | |

MTAB* is myristic trimethylammonium bromide (cationic surfactant).

All the compositions according to the examples above exhibit superior limescale performance while being substantially odor free.

What is claimed is:

1. An aqueous composition having a pH of from about 0.1 to about 5 comprising an organic acid and surfactant, wherein said surfactant consists essentially of cationic surfactant, zwitterionic surfactant, amphoteric surfactant, and mixtures thereof; said composition is perfume-free; and said composition is substantially odor-free.

2. A composition according to claim 1 wherein said composition is a limescale removing composition having a pH of from about 0.1 to about 3.

3. A composition according to claim 1 wherein said organic acid is maleic acid.

4. A composition according to claim 3 comprising from about 0.1% to about 45% by weight of the total compositions of said acid.

5. A composition according to claim 3 comprising from about 1% to about 25% by weight of the total compositions of said acid.

6. A composition according to claim 3 comprising from about 8% to about 20% by weight of the total compositions of said acid.

7. A composition according to claim 1 comprising from about 0.01% to about 10% by weight of the total compositions of said surfactant.

8. A composition according to claim 7 comprising from about 0.01% to about 5% by weight of the total compositions of said surfactant.

9. A composition according to claim 7 comprising from about 0.01% to about 2% by weight of the total compositions of said surfactant.

10. A composition according to claim 3 comprising from about 0.01% to about 10% by weight of the total compositions of said surfactant.

11. A composition according to claim 1 wherein said surfactant is a cationic surfactant of the formula $R_1R_2R_3R_4N^+$ $X^-$, wherein X is a counteranion, $R_1$ is a $C_8$–$C_{20}$ hydrocarbon chain and $R_2$, $R_3$ and $R_4$ are independently selected from H or $C_1$–$C_4$ hydrocarbon chains or mixtures thereof.

12. A composition according to claim 11 wherein in said cationic surfactant X is bromide or chloride, $R_1$ is a $C_{12}$–$C_{18}$ hydrocarbon chain.

13. A composition according to claim 3 wherein said surfactant is a cationic surfactant of the formula $R_1R_2R_3R_4N^+$ $X^-$, wherein X is a counteranion, $R_1$ is a $C_8$–$C_{20}$ hydrocarbon chain and $R_2$, $R_3$ and $R_4$ are independently selected from H or $C_1$–$C_4$ hydrocarbon chains or mixtures thereof.

14. A composition according to claim 1 wherein said surfactant is a zwitterionic surfactant of the formula

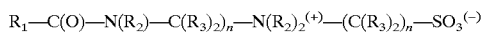

or

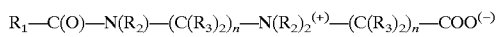

wherein each $R_1$ is an alkyl group containing from about 8 up to about 20 carbon atoms, each $R_2$ is either a hydrogen, when attached to the amido nitrogen, short chain alkyl or substituted alkyl containing from about 1 to about 4 carbon atoms, each $R_3$ is selected from the group consisting of hydrogen and hydroxy groups and each n is a number from 1 to 4, with no more than one hydroxy group in any $(C(R_3)_2)$ moiety or mixtures thereof.

15. A composition according to claim 14 wherein in said zwitterionic surfactant $R_1$ is an alkyl group containing up to about 18 carbon atoms, $R_2$ is a group selected from the group consisting of methyl, ethyl, propyl, hydroxy substituted ethyl or propyl and mixtures thereof, and n is a number from 2 to 3.

16. A composition according to claim 14 wherein said zwitterionic surfactant is a $C_{10}$–$C_{14}$ fatty acylamidopropylene(hydroxypropylene)sulfobetaine.

17. A composition according to claim 3 wherein said surfactant is a zwitterionic surfactant of the formula

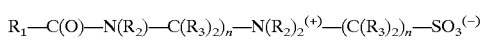

or

wherein each $R_1$ is an alkyl group containing from about 8 up to about 20 carbon atoms, each $R_2$ is either a hydrogen, when attached to the amido nitrogen, short chain alkyl or substituted alkyl containing from about 1 to about 4 carbon atoms, each $R_3$ is selected from the group consisting of hydrogen and hydroxy groups and each n is a number from 1 to 4, with no more than one hydroxy group in any $(C(R_3)_2)$ moiety or mixtures thereof.

18. A composition according to claim 1 wherein said composition further comprises sulfamic acid, methanesulfonic acid, citric acid, phosphoric acid, hydrochloric acid or mixtures thereof.

19. A composition according to claim 3, wherein said composition further comprises sulfamic acid, methanesulfonic acid, citric acid, phosphoric acid, hydrochloric acid or mixtures thereof.

20. The composition of claim 12 wherein $R_1$ is $C_{14}$, $C_{16}$ or $C_{16}$ and $R_2$, $R_3$, and $R_4$ are all methyl.

21. A process of descaling appliances wherein an acidic composition comprising a surfactant consisting of cationic, zwitterionic, amphoteric surfactants or mixtures thereof is applied in its neat form or in its diluted form to said appliances, then left to act and then removed by rinsing.

22. The process of claim 21 wherein said acidic composition comprises maleic acid.

23. The process of descaling appliances by applying an effective amount of an aqueous composition having a pH of from about 0.1 to about 5, either in its neat form, or diluted, said composition comprising an organic acid selected from the group consisting of sulfamic acid, methanesulfonic acid, citric acid, phosphonic acid, hydrochloric acid, and mixtures thereof and additionally comprising maleic acid, and surfactant, wherein said surfactant consists essentially of cationic surfactant, zwitterionic surfactant, amphoteric surfactant, and mixtures thereof; said composition is perfume-free; and said composition is substantially odor-free.

* * * * *